United States Patent
Miranda et al.

(10) Patent No.: US 6,571,332 B1
(45) Date of Patent: May 27, 2003

(54) METHOD AND APPARATUS FOR COMBINED TRANSACTION REORDERING AND BUFFER MANAGEMENT

(75) Inventors: Paul C. Miranda, Austin, TX (US);
Larry D. Hewitt, Austin, TX (US);
Stephen C. Ennis, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/546,979

(22) Filed: Apr. 11, 2000

(51) Int. Cl.[7] .............................. G06F 9/26; G06F 9/32
(52) U.S. Cl. ........................ 712/245; 712/215; 710/40; 710/112; 709/103; 709/106; 711/145; 711/156; 711/220
(58) Field of Search ............................... 709/102, 103, 709/106; 710/39, 40, 52, 54, 112, 244; 711/144, 145, 156, 220; 712/215, 239, 245

(56) References Cited

U.S. PATENT DOCUMENTS

| | | | |
|---|---|---|---|
| 5,197,135 A | * | 3/1993 | Eickemeyer et al. ........ 712/215 |
| 5,208,914 A | | 5/1993 | Beard et al. |
| 5,325,487 A | | 6/1994 | Au et al. |
| 5,915,110 A | * | 6/1999 | Witt et al. .................. 712/239 |
| 5,996,036 A | | 11/1999 | Kelly |
| 6,292,807 B1 | * | 9/2001 | Larson ........................ 707/201 |

FOREIGN PATENT DOCUMENTS

EP          0520835          12/1992

* cited by examiner

*Primary Examiner*—B. James Peikari
(74) *Attorney, Agent, or Firm*—Meyertons, Hood, Kivlin, Kowert & Goetzel, P.C.; B. Noël Kivlin

(57) ABSTRACT

A method and apparatus for combined transaction reordering and buffer management. The apparatus may include a buffer, a first generator circuit and a second generator circuit. The buffer is configured to store memory transaction responses received from a memory controller in a plurality of addressable locations. The first generator circuit is configured to generate a first memory transaction request encoded with a first tag corresponding to an address in the buffer in response to receiving a first memory request. The second generator circuit is configured to generate a second tag using the size of said first memory request added to the first tag. The first generator circuit may be further configured to generate a second memory transaction request encoded with the second tag corresponding to a second address in the buffer in response to receiving a second memory request successive to the first memory request. The second generator circuit may be further configured to generate a third tag using the size of the second memory request added to said second tag.

25 Claims, 2 Drawing Sheets

METHOD AND APPARATUS FOR COMBINED TRANSACTION REORDERING AND BUFFER MANAGEMENT

BACKGROUND OF THE INVENTION

1. Field of the Invention

This invention relates to computer systems and, more particularly, to system memory transactions.

2. Description of the Related Art

In general, computer systems include a microprocessor, system memory, a video graphics adapter and a plurality of peripheral devices. The memory and peripheral devices are typically coupled to the microprocessor through one or more system buses. In personal computers (PCs), these buses are controlled by bridging logic and controllers which may be separated into different integrated circuits: The system controller and the peripheral bus controller. The system controller, commonly referred to as a northbridge in PC systems, includes bridging logic, a memory controller and an accelerated graphics port (AGP) controller and a peripheral bus controller.

Many peripheral devices and the graphics port commonly need access to the system memory through the memory controller. Typically, theses devices request memory accesses or transactions in a particular order, but receive the transaction responses in a different order. Therefore the various peripheral controllers and the graphics port controller must use some method of keeping track of which responses correspond to which requests. One method of keeping track of the requests and responses is to attach a linearly incrementing tag to each request. A request tag table is then used to store the request tags. As the responses come back, they can be sorted and reordered by matching the response tags with the request tags in the request tag table. The reordered responses can then be stored in a response buffer. Additional logic, such as a free buffer space counter, may be employed to prohibit the response buffer from being overflowed by not allowing requests to issue while the response buffer is full. Additional methods may employ a large enough response buffer that the free buffer space counter is not necessary.

Although the above methods may provide a method of reordering transactions and keeping track of which responses correspond to which requests, it is desirable to use a different method to provide buffer reordering and management.

SUMMARY OF THE INVENTION

The problems outlined above may in large part be solved by a method and apparatus for transaction reordering and buffer management. In one embodiment, the apparatus may include a buffer, a first generator circuit and a second generator circuit. The buffer is configured to store memory transaction responses received from a memory controller in a plurality of addressable locations. The first generator circuit is coupled to the memory controller and is configured to generate a first memory transaction request encoded with a first tag corresponding to an address in the buffer in response to receiving a first memory request. The second generator circuit is coupled to the first generator circuit and is configured to generate a second tag using the size of said first memory request added to the first tag.

In an additional embodiment, the first generator circuit may be further configured to generate a second memory transaction request encoded with the second tag corresponding to a second address in the buffer in response to receiving a second memory request successive to the first memory request. The second generator circuit may be further configured to generate a third tag using the size of the second memory request added to said second tag.

The generation of transaction requests encoded with tags which correspond to addresses in the transaction response buffer based on the size of the requested transaction may advantageously simplify the process of reordering memory transaction responses.

BRIEF DESCRIPTION OF THE DRAWINGS

Other objects and advantages of the invention will become apparent upon reading the following detailed description and upon reference to the accompanying drawings in which.

Figure 1:
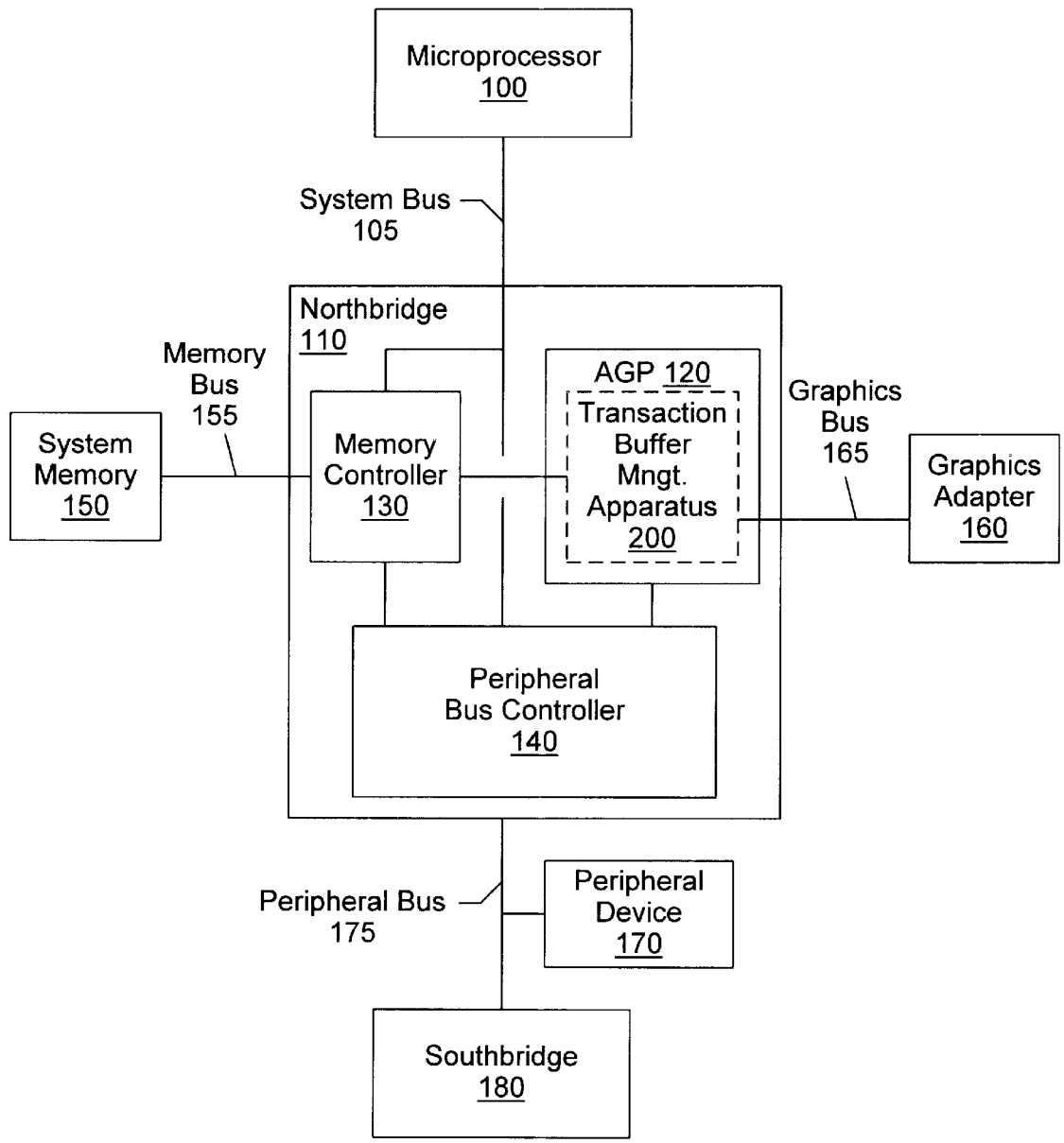
FIG. 1 is a diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Referring to FIG. 1, a diagram of one embodiment of a computer system is shown. The computer system of FIG. 1 includes a microprocessor 100 coupled to a northbridge 110 through a system bus 105 and a southbridge 180 coupled to northbridge 110 through a peripheral bus 175. Northbridge 110 includes a memory controller 130 coupled to a system memory 155 through a memory bus. Northbridge 110 also includes a peripheral bus controller 140 coupled to a peripheral device 170 through peripheral bus 175 and an accelerated graphics port (AGP) controller 120 coupled to a graphics adapter 160 through a graphics bus 165. Both AGP controller 120 and peripheral bus controller 140 are coupled to memory controller 130 allowing memory transactions to occur. AGP controller 120 includes a transaction buffer management apparatus 200, which will be described in more detail below.

It is noted however, that in other embodiments, the location of the components included in northbridge 110 and southbridge 180 may be different. For example, AGP controller 120 may be physically located in southbridge 180 or it may be part of microprocessor 100. The above system architecture of FIG. 1 is shown only as an example of how a system may be configured.

In one embodiment, a controller such as AGP controller 120 may make a system memory request to memory controller 130. The request may be a read request or a write request. Logic in AGP controller 120 may separate read requests from write requests by using two different request queues. As will be described further below in FIG. 2, any request whether a read request or a write request, will be encoded with a tag. The tag is used to differentiate the requests from one another. Additionally, the requests may be sent in a particular order, but due to prioritization schemes, the responses may come back from memory controller 130 in a different order, thereby creating the need to keep track of the requests and their corresponding responses.

Figure 2:
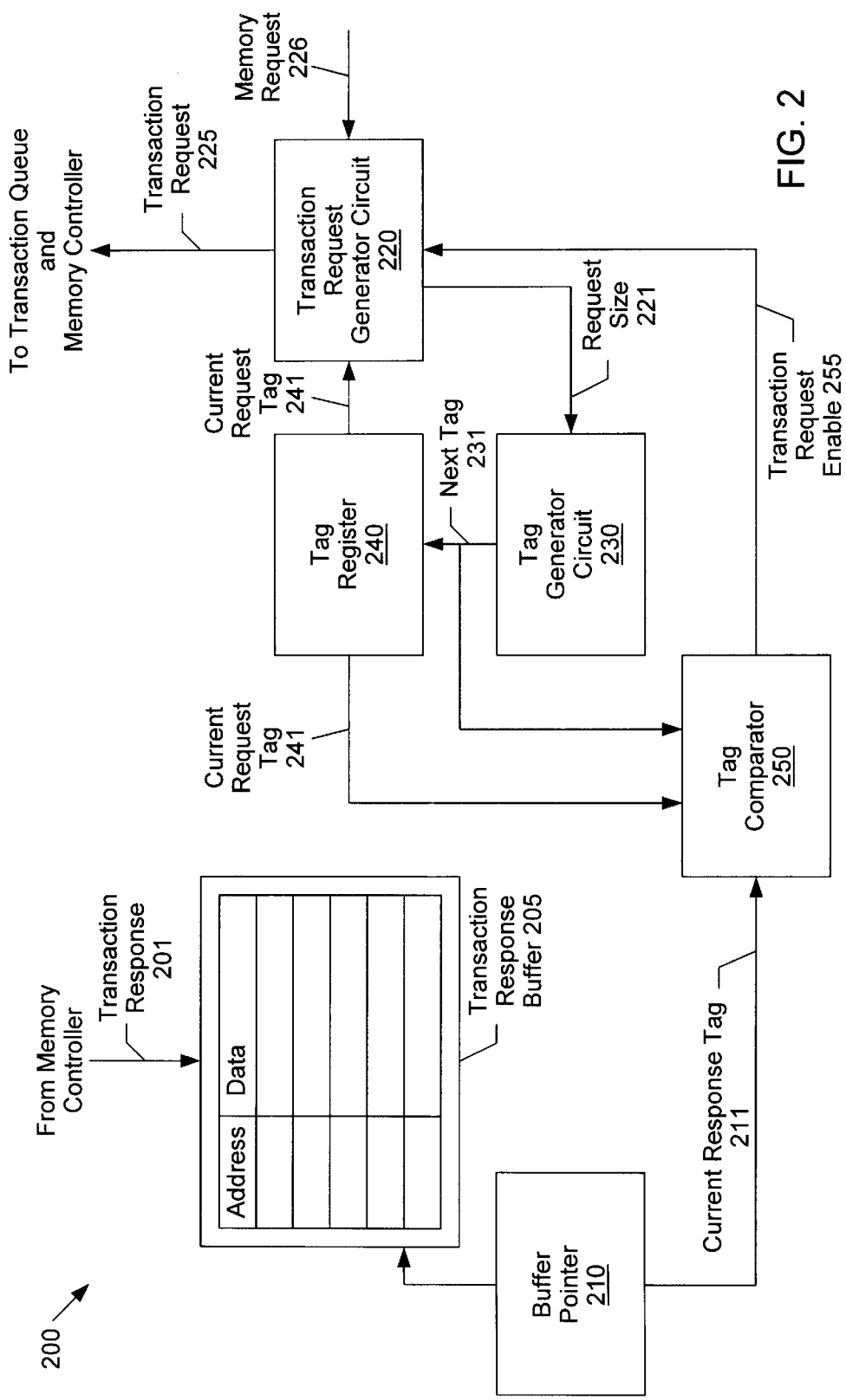
FIG. 2 is a block diagram of one embodiment of a transaction buffer management apparatus.

Turning now to FIG. 2, a block diagram of one embodiment of transaction buffer management apparatus 200 is shown. Transaction buffer management apparatus 200 includes a transaction response buffer 205 coupled to memory controller 130 of FIG. 1. Transaction response buffer 205 of FIG. 2 is also coupled to a buffer pointer 210. Buffer pointer 210 is coupled to a tag comparator 250. Tag comparator 250 is coupled to a transaction request generator circuit 220. Transaction request generator circuit 220 is coupled to a tag generator circuit 230 and a tag register 240.

In general, when a memory request 226 arrives at transaction request generator circuit 220, memory request 226 is encoded with a tag which is held in tag register 240. The tag is generated by tag generator circuit 230 and stored in tag register 240. Before a transaction request 225 is released to a transaction queue, tag comparator 250 compares a next tag 231 to a current response tag 211 pointed to by buffer pointer 210. A more detailed example follows below.

When a first memory request arrives at transaction request generator circuit 220, tag register 240 is initialized to #0h and represents the initial tag corresponding to the first location in transaction response buffer 205. The memory request is encoded with this initial tag. Tag generator circuit 230 determines the size of memory request 226 and generates a next tag 231 by adding the size of memory request 226 to the value of the initial tag. The tags generated by tag generator circuit 230 represent addresses in transaction response buffer 205. In this case, if memory request 226 were 8 bytes, then next tag 231 would be #8h.

Once next tag 231 is generated, tag comparator 250 performs a series of calculations to either enable or disable transaction request generator circuit 220 from releasing transaction request 225 to a transaction queue. The first calculation takes the difference between current response tag 211 and a current request tag 241 stored in tag, register 240 using binary unsigned subtraction. The second calculation takes the difference between next tag 231 and current request tag 241 using binary unsigned subtraction. Then tag comparator 250 compares the first calculation with the second calculation. If the first calculation is greater than the second calculation, then tag comparator 250 allows transaction request enable 255 to enable transaction request generator circuit 220 to release transaction request 225 to a transaction queue. When a second memory request 226 of 16 bytes, for example, is received by transaction request generator circuit 220, memory request 226 is encoded with the tag held in tag register 240, which is #8h. Tag generator circuit 230 generates next tag 231 by adding the 16 bytes to the tag held in tag register 240. In this example, next tag 231 would be #18h. Next tag 231 is stored in tag register 240 awaiting the next memory request. In order to enable transaction request generator circuit 220 when the first memory request arrives, a buffer empty bit may be used to override the result of the compare calculations performed by tag comparator 250, since current request tag 241 and current response tag 211 are both zero. In alternative embodiments, other features may be used to enable the first transaction request such as forcing tag register 240 to start at a non-zero value.

To prevent response buffer overflow, tag comparator 250 prevents transaction request generator circuit 220 from releasing transaction request 225 to the request queue if a response to transaction request 225 may overwrite data in buffer 205. When tag generator circuit 230 reaches the last addressable location, the next tag will wrap around to #0h. The above tag encoding process is repeated each time a memory request is received by transaction request generator circuit 220.

As transaction response 201 comes back from memory controller 130 of FIG. 1, it is stored in transaction response buffer 205 of FIG. 2. Each transaction response 201 contains data and a response tag which may be an address or a partial address in transaction response buffer 201. Transaction response 201 is stored at the address specified by its tag. Buffer pointer 210 points to the address of the transaction response 201 stored in transaction response buffer 205 which is currently being serviced and sends current response tag 211 to tag comparator 250.

In the above example the tags generated by tag generator circuit 230 represented all the bits in each address of transaction response buffer 205. In other embodiments, the tags may only be some number of significant bits of the available addresses. The number of most significant bits (MSBs) used determines the granularity with which the individual locations can be addressed. For example, if transaction response buffer 205 contains 64K addressable locations, then this corresponds to #0000h through #FFFFh addresses. If only the 3 MSBs were used as a tag (e.g. #FFFh), then the addresses will only be accessible in blocks of 16 bytes. This would change how tag generator circuit 230 generates each next tag 231. When next tag 231 is generated, the memory request size would be added to the tag stored in tag register 240 then, if next tag 231 did not fall on an addressable block boundary, next tag 231 would be rounded up to the next higher block size. For example, assuming the 64K address space described above and using 3 MSB. If the first memory request is 4 bytes, the first tag is #000h and next tag 231 would be #001h. Since #0000h+#0004h=#0004h is not addressable on a block boundary, then #0004h gets rounded up to the next addressable block, which is #001h. When another memory request 226 of 16 bytes is received by transaction request generator circuit 220, memory request 226 is encoded with the tag held in tag register 240, which is #001h. Then tag generator circuit 230 generates next tag 231 by adding the 16 bytes to the tag held in tag register 240. In this example, next tag 231 would be #002h, since #002h does fall on an addressable block boundary. Next tag 231 is stored in tag register 240 awaiting the next memory request.

Numerous variations and modifications will become apparent to those skilled in the art once the above disclosure is fully appreciated. It is intended that the following claims be interpreted to embrace all such variations and modifications.

What is claimed is:

1. An apparatus comprising:

a buffer configured to store a memory transaction response received from a memory controller in an addressable location;

a first generator circuit coupled to said memory controller and configured to generate a first memory transaction request encoded with a first tag corresponding to a first address in said buffer in response to receiving a first memory request; and a second generator circuit coupled to said first generator circuit and configured to generate a second tag using the size of said first memory request added to said first tag.

2. The apparatus as recited in claim 1, wherein said first generator circuit is further configured to generate a second memory transaction request encoded with said second tag corresponding to a second address in said buffer in response to receiving a second memory request successive to said first memory request.

3. The apparatus as recited in claim 2, wherein said second generator circuit is further configured to generate a third tag using the size of said second memory request added to said second tag.

4. The apparatus as recited in claim 1 further comprising a pointer coupled to said buffer and configured to point to an address of a stored memory transaction response and to indicate a response tag corresponding to said stored memory transaction response.

5. The apparatus as recited in claim 4 further comprising a tag register coupled to said first generator unit and configured to store said second tag.

6. The apparatus as recited in claim 5 further comprising a tag comparator coupled to said pointer and configured to disable said first generator circuit if said first memory transaction request encoded with said first tag will overflow said buffer.

7. The apparatus as recited in claim 6, wherein said tag comparator is further configured to enable said first generator circuit only if the binary unsigned difference between said response tag and said first tag is greater than the binary unsigned difference between said second tag and said first tag.

8. The apparatus as recited in claim 1, wherein said memory transaction response comprises data and a response tag, wherein said response tag is a multiple-bit portion of an address in said buffer.

9. The apparatus as recited in claim 8, wherein said buffer is further configured to receive said memory transaction response and to store said memory transaction response in an address specified by said response tag.

10. A method for operating an apparatus including a buffer, a pointer, a first generator circuit, a second generator circuit and a tag register, said method comprising:
    generating a first memory transaction request encoded with a first tag corresponding to an address in said buffer in response to receiving a first memory request;
    pointing to an address of a stored transaction response and indicating a response tag corresponding to said stored transaction response;
    generating a second tag using the size of said first memory request added to said first tag; and
    disabling said first generator circuit if said first memory transaction request encoded with said first tag will overflow said buffer.

11. The method as recited in claim 10 further comprising generating a second memory transaction request encoded with said second tag corresponding to a second address in said buffer in response to receiving a second memory request successive to said first memory request.

12. The method as recited in claim 11 further comprising generating a third tag using the size of said second memory request added to said second tag.

13. The method as recited in claim 12 further comprising storing said second tag in said tag register.

14. The method as recited in claim 13 further comprising receiving a memory transaction response and to store said memory transaction response in said buffer at an address specified by said response tag.

15. The method as recited in claim 14, wherein said memory transaction response comprises data and said response tag, wherein said response tag is a multiple-bit portion of an address in said buffer.

16. The method as recited in claim 15 further comprising enabling said first generator circuit only if the binary unsigned difference between said response tag and said first tag is greater than the binary unsigned difference between said second tag and said first tag.

17. A computer system comprising:
    a microprocessor;
    a memory controller coupled to said microprocessor;
    a system memory coupled to said memory controller; and
    an apparatus coupled to said memory controller, said apparatus including:
        a buffer configured to store a memory transaction response received from a memory controller in an addressable location;
        a first generator circuit coupled to said memory controller and configured to generate a first memory transaction request encoded with a first tag corresponding to first address in said buffer in response to receiving a first memory request; and
        a second generator circuit coupled to said first generator circuit and configured to generate a second tag using the size of said first memory request added to said first tag.

18. The system as recited in claim 17, wherein said first generator circuit is further configured to generate a second memory transaction request encoded with said second tag corresponding to a second address in said buffer in response to receiving a second memory request successive to said first memory request.

19. The system as recited in claim 18, wherein said second generator circuit is further configured to generate a third tag value using the size of said second memory request added to said second tag.

20. The system as recited in claim 17, wherein said apparatus further comprises a pointer coupled to said buffer and configured to point to an address of a stored memory transaction response and to indicate a response tag corresponding to said stored memory transaction response.

21. The system as recited in claim 20, wherein said apparatus further comprises a tag register coupled to said first generator unit and configured to store said second tag.

22. The system as recited in claim 21, wherein said apparatus further comprises a tag comparator coupled to said pointer and configured to disable said first generator circuit if said first memory transaction request encoded with said first tag will overflow said buffer.

23. The system as recited in claim 22, wherein said tag comparator is further configured to enable said first generator circuit only if the binary unsigned difference between said response tag and said first tag is greater than the binary unsigned difference between said second tag and said first tag.

24. The system as recited in claim 17, wherein said memory transaction response comprises data and a response tag, wherein said response tag is a multiple-bit portion of an address in said buffer.

25. The system as recited in claim 24, wherein said buffer is further configured to receive said memory transaction response and to store said memory transaction response in an address specified by said response tag.

* * * * *